United States Patent
Dubuit

Patent Number: 5,549,444
Date of Patent: Aug. 27, 1996

[54] LOADER FOR MACHINE FOR PRINTING OBJECTS FROM A STACK

[75] Inventor: Jean-Louis Dubuit, Paris, France

[73] Assignee: Societe d'Exploitation des Machines Dubuit, Noisy Le Grand, France

[21] Appl. No.: 319,844

[22] Filed: Oct. 7, 1994

[30] Foreign Application Priority Data

Oct. 13, 1993 [FR] France .................. 93 12171

[51] Int. Cl.⁶ .................................................. B65G 59/04
[52] U.S. Cl. .................... 414/796.7; 414/795.8; 414/797; 414/938; 414/941
[58] Field of Search ................ 414/796.7, 797, 414/795.8, 938, 27, 908, 936, 926, 941; 198/468.2; 294/16, 106, 115, 907; 271/90, 97

[56] References Cited

U.S. PATENT DOCUMENTS

| | | | |
|---|---|---|---|
| 4,143,776 | 3/1979 | Meyers et al. | 414/735 |
| 4,416,577 | 11/1983 | Inaba et al. | 414/736 |
| 4,784,422 | 11/1988 | Jones et al. | 294/106 |
| 4,878,705 | 11/1989 | Arnquist | 294/907 |
| 4,921,397 | 5/1990 | Watanabe | 414/27 |
| 5,165,340 | 11/1992 | Karlyn et al. | 101/126 |
| 5,313,882 | 5/1994 | Karlyn et al. | 414/796.7 |

FOREIGN PATENT DOCUMENTS

| | | | |
|---|---|---|---|
| 1239865 | 9/1989 | Japan | 414/941 |
| 5055342 | 3/1993 | Japan | 414/941 |
| 1238834 | 6/1986 | U.S.S.R. | 414/796.7 |

Primary Examiner—Karen Merritt
Assistant Examiner—Douglas Hess
Attorney, Agent, or Firm—Young & Thompson

[57] ABSTRACT

A loader for a machine for printing objects presented in a stack includes a lifting device which lifts a stack of objects to be printed stepwise as objects are taken from the stack and a reciprocating transfer device having at least one take-up unit taking an object from the stack on each cycle to convey it to the printing machine. The loader has a retaining clamp with two branches moveable between an away position and a close position in which they can hold a specific number of objects. Level compensating arrangements operate between the retaining clamp and the associated take-up unit. The printing machine can be a machine for printing compact discs, for example.

17 Claims, 2 Drawing Sheets

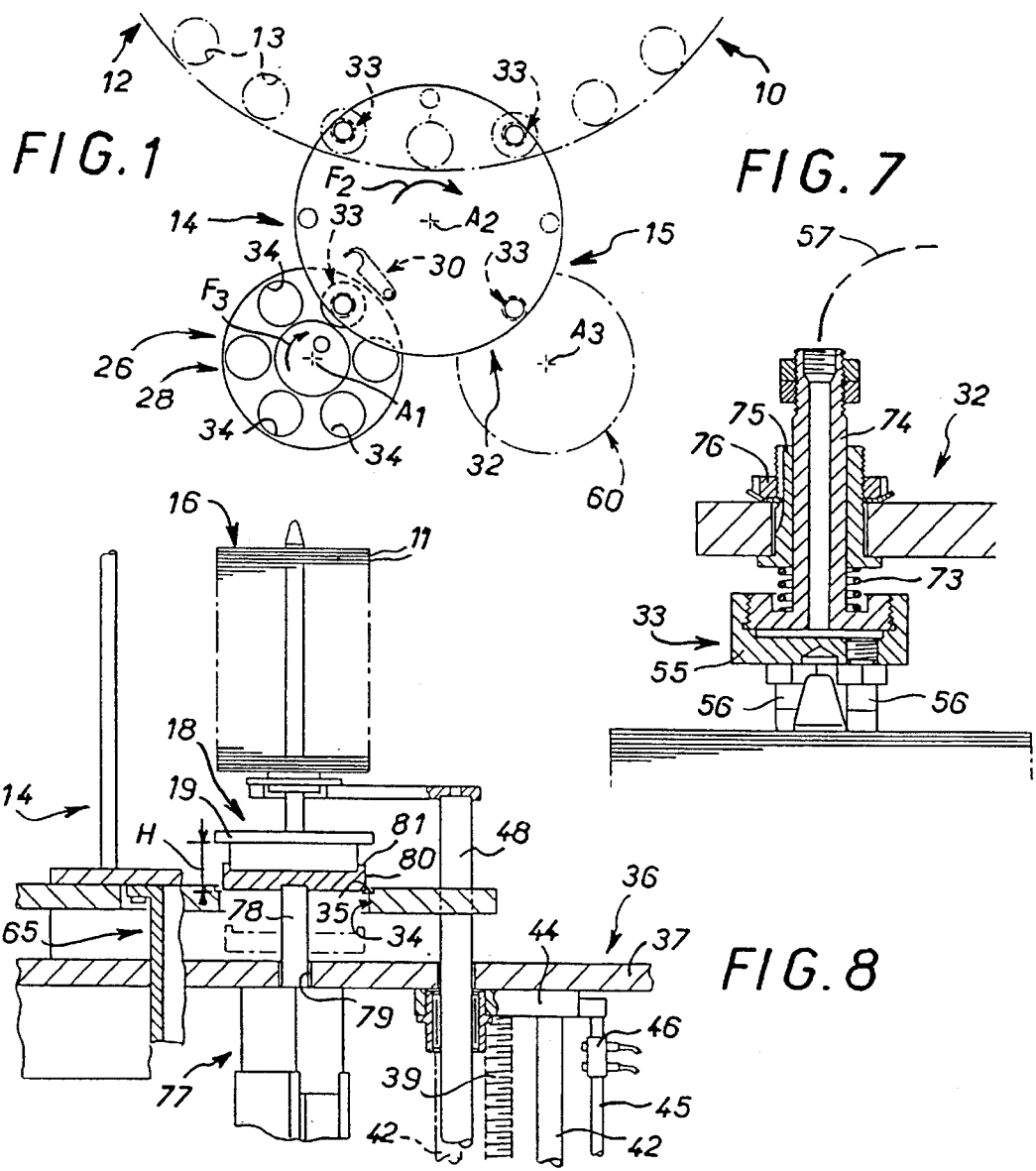

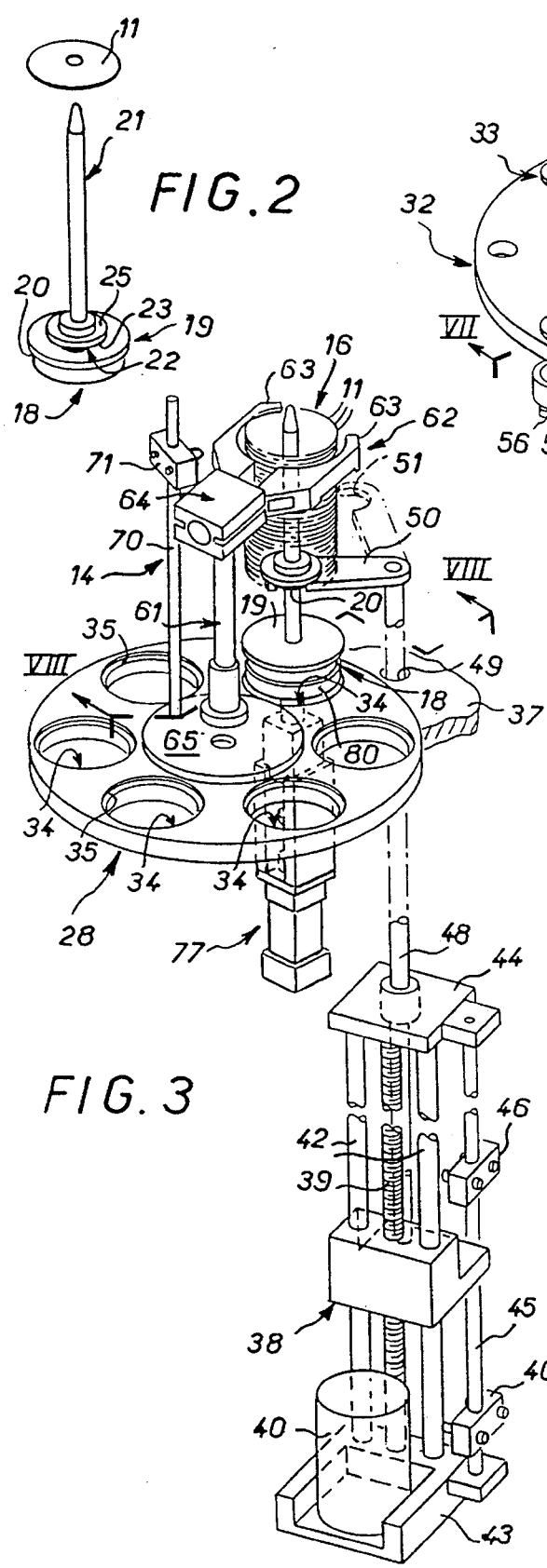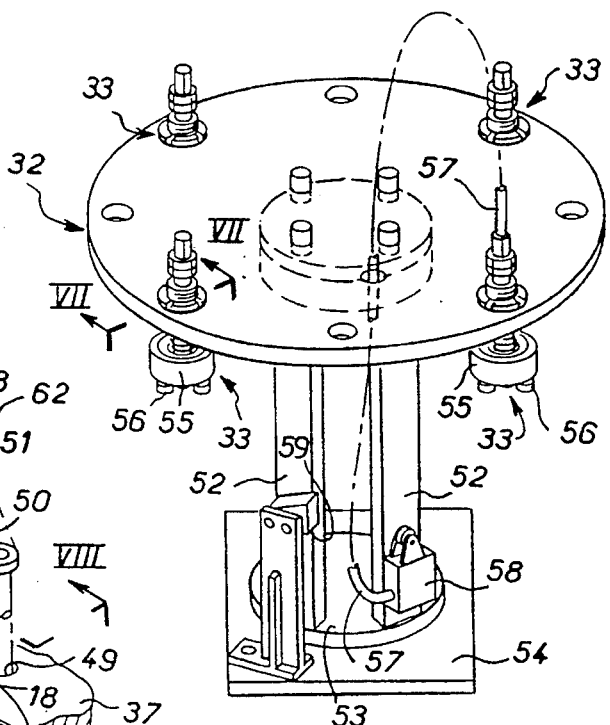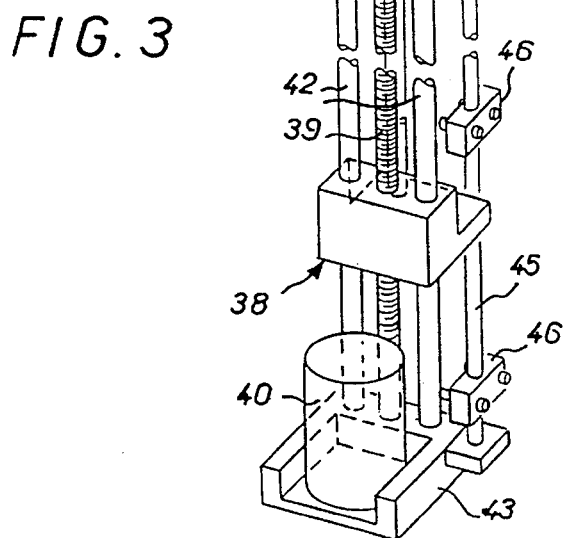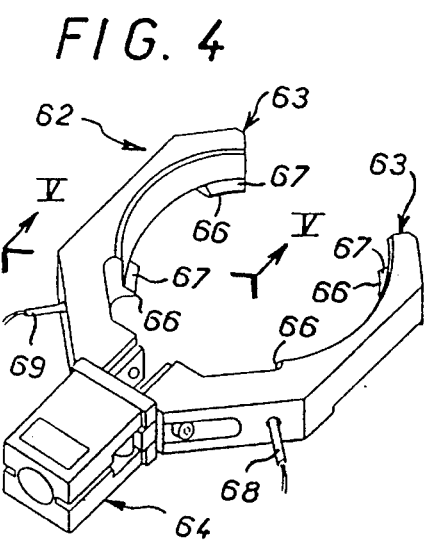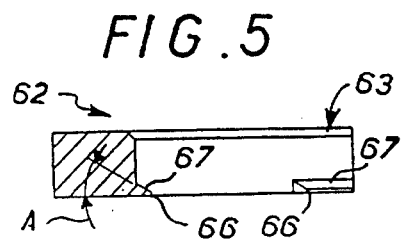

LOADER FOR MACHINE FOR PRINTING OBJECTS FROM A STACK

BACKGROUND OF THE INVENTION

1. Field of the Invention

The present invention concerns printing machines in general and in particular the situation in which the objects to be printed are presented in a stack.

This is the case with compact discs, for example.

2. Description of the Prior Art

The present invention is more precisely directed to the situation in which, for automatically feeding the printing machine with objects to be printed, a loader is used including a presentation device which is adapted to convey to a loading station at least one stack support carrying a stack of objects to be printed, a lifting device operative at the loading station and adapted to take up a stack of objects from below and to raise it stepwise as objects are removed from it, and a transfer device operative between the loading station and the printing machine and adapted to take an object from the stack at the loading station and then to convey this object to the printing machine, the transfer device being provided for this purpose with a take-up unit and being reciprocated vertically during each take-up cycle so that it can take up an object on the underlying stack.

For the system to operate correctly the loader is always controlled in synchronism with the printing machine.

Accordingly, at present the printing machine ceases to be fed with objects to be printed each time that the stack is changed, and for as long as it takes the presentation device to withdraw from the loading station the stack support which has just been emptied and to substitute for it a new stack support carrying a new stack of objects to be printed. This is detrimental to the productivity of the printing machine.

A general object of the present invention is an arrangement for masking the consequences of the inevitable changing of stack supports.

SUMMARY OF THE INVENTION

To be more precise, the present invention consists in a loader for machine for printing objects presented in a stack including a presentation device adapted to convey to a loading station at least one stack support carrying a stack of objects to be printed, a lifting device operative at said loading station adapted to engage a stack of objects from below and to raise it stepwise as objects are taken from it, a transfer device operative between said loading station and said printing machine adapted to take an object from the stack present at said loading station and then to convey said object to said printing machine, said transfer device being equipped for this purpose with at least one take-up unit and being reciprocated vertically during each take-up cycle, a retaining clamp at said loading station having two branches mobile relative to each other and both mobile transversely to the path of movement of said lifting device between an away position wherein they do not impede passage of said stack of objects carried thereby and a close position in which they are adapted to retain from below a specific number of objects, and level compensating means operative between said retaining clamp and said take-up unit.

For example, level compensation is achieved by having the take-up unit mobile vertically on the transfer device against spring means which urge it downwards at all times.

Be this as it may, the objects to be printed held by the clamp of the invention constitute a reserve enabling the printing machine to continue to be fed with objects to be printed while the stack support is changed, while the level compensating means enable the transfer device to cope with variations in the take-up height which inevitably occur as this reserve is progressively used up.

The maximum capacity of the printing machine can therefore be advantageously utilized by using a loader of the invention.

The features and advantages of the invention will emerge from the following description given by way of example with reference to the appended drawings.

BRIEF DESCRIPTION OF THE DRAWINGS

FIG. 1 is a plan view showing the relative positions of the printing machine and the loader feeding it.

FIG. 2 is an exploded perspective view to a larger scale of an object to be printed and of the stack support.

FIG. 3 is an exploded and locally cut away perspective view of the presentation and lifting devices of the loader and the clamp utilized therein in accordance with the invention.

FIG. 4 is a perspective view of the clamp on its own and to a larger scale.

FIG. 5 is a view of one branch of the clamp in transverse cross-section on the line V—V in FIG. 4 and to a still larger scale.

FIG. 6 is a perspective view of the transfer device of the loader to substantially the same scale as FIG. 3.

FIG. 7 is a partial view of the transfer device in transverse cross-section on the line VII—VII in FIG. 6 and to a larger scale.

FIG. 8 is a partly cut away partial view of the presentation and lifting devices in transverse cross-section on the broken line VIII—VIII in FIG. 3 and to a smaller scale.

FIGS. 9A, 9B, 9C and 9D are views derived from that of FIG. 8, but to a smaller scale, showing in diagrammatic form various successive phases of operation of the loader of the invention.

DETAILED DESCRIPTION OF THE PREFERRED EMBODIMENT

Referring to the figures, the overall aim is to feed a printing machine 10 with objects 11 to be printed.

Neither the nature nor the construction of the printing machine 10 are relevant in the present context.

For this reason the printing machine 10 will not be described here.

Suffice to say that it is a silkscreen printing machine, for example, and includes a table 12 rotatable stepwise about a vertical axis (not shown in FIG. 1) and having equi-angularly spaced around its periphery a plurality of object stations 13, for example 24 such stations, each adapted to receive an object 11. The object stations 13 are moved in succession, during one rotation, to a loading station 14, to a plurality of workstations such as printing stations and drying stations, not shown in FIG. 1 and the number of which varies according to the number of colors to be printed, and to an offloading station 15.

The objects 11 to be printed can be of any kind, but are presented in the form of a stack 16.

In the embodiment shown they are compact discs.

Identical stack supports 18 are used to present the stacks 16 of objects 11.

The stack supports 18 each include a circular base 19 with a transverse shoulder 20 machined on its bottom surface, a column 21 fastened to the base 19, projecting axially from the latter and pointed at its upper end, and a ring 22 sliding on the column 21 and with a transverse shoulder 23 machined into its bottom surface.

The ring 22 has a shoulder 25 machined into its top surface to limit the surface area of contact with the overlying object 11.

A loader 26 is employed to feed the printing machine 10 with objects 11 to be printed.

In a manner that is known in itself, and by virtue of provisions to be described in more detail below, the loader 26 includes a presentation device 28 adapted to convey to the loading station 14 at least one stack support 18 carrying a stack 16 of objects 11 to be printed, a lifting device 30 operative at the loading station 14 and adapted to take up from below a stack 16 of objects 11 and to raise it stepwise as objects 11 are taken from the stack, and a transfer device 32 operative between the loading station 14 and the printing machine 10 and adapted to take an object 11 from the stack 16 at the loading station 14 and then to convey the object 11 to the printing machine 10, the transfer device 32 being provided for this purpose with at least one take-up unit 33 and being reciprocated vertically during each take-up cycle to take up an object 11 on the underlying stack 16.

In the embodiment shown the presentation device 28 is an annular plate rotatable stepwise about a vertical axis A1 parallel to the rotation axis of the table 12 of the printing machine 10 and with a plurality of identical object stations 34 equi-angularly spaced around its periphery, each adapted to receive a stack support 18.

Six object stations 34 are provided in this example and for reasons that emerge below each consists of a recess passing completely through the presentation device 28 with a circular contour complementary to that of the base 19 of the stack support 18. It has a recessed transverse shoulder 35 complementary to the base 19.

The presentation device 28 rotates on a frame 36, only part of which is shown in the figures and which will not be described in complete detail here.

Suffice to say that the frame 36 includes a fixed table 37 under the presentation device 28.

As seen more clearly in FIG. 3, the lifting device 30 includes, under the fixed table 37, a nut assembly 38 which meshes with a lead screw 39 operated by a stepper motor 40 and is slidably engaged with two guides 42 parallel to the screw 39.

The screw 39 and the guides 42 extend vertically and therefore parallel to the vertical axis A1 of the presentation device 28 between a baseplate 43 fastened to the frame 36 and carrying the stepper motor 40 and the transmission (not shown in the figures) connecting the output shaft of the motor to the screw 39 and a plate 44 fastened to the fixed table 37 of the frame 36, with which its bottom surface is in contact.

A column 45 parallel to the screw 39 and to the guides 42 carries two level sensing cells 46 which are staggered in height for reasons explained below.

The nut assembly 38 carries a rod 48 parallel to the screw 39 and to the guides 42. The rod passes through a bore 49 in the fixed table 37 and carries a transverse arm 50 level with the loading station 14. It is pivoted by a rotary actuator (not shown in the figures) to reciprocate between a deployed position in which, as shown in full line in FIGS. 3 and 8, the arm 50 interferes with the loading station 14 and a retracted position in which, as shown in chain-dotted outline in FIGS. 1 and 3, the arm 50 is away from the loading station 14.

The arm 50 has a half-moon notch 51 at its free end.

It is therefore adapted to be inserted between the base 19 of the stack support 18 at the loading station 14 and the ring 22 of the stack support 18, engaging in the transverse shoulder 20 of the ring 22.

In the embodiment shown the transfer device 32 comprises a circular plate rotatable stepwise about a vertical axis A2 parallel to the vertical axis A1 of the presentation device 28 and therefore parallel to the rotation axis of the table 12 of the printing machine 10. It carries a plurality of take-up units 33 equi-angularly spaced around its periphery.

There are four take-up units 33 in this example arranged in two pairs at 90° to each other.

They project downwardly from the bottom surface of the transfer device 32.

Referring to FIG. 6, the transfer device 32 is carried by uprights 52 projecting from a circular baseplate 53 which can rotate relative to a plate 54 carrying the assembly and adapted to be reciprocated vertically relative to the frame 36 by means familiar to the person skilled in the art and therefore not described here.

In the embodiment shown the take-up units 33 operate by suction.

Accordingly, each includes a head 55 with a plurality of suction nozzles 56 equi-angularly spaced around its axis on its bottom surface. There are three nozzles, for example. They communicate via a pipe 57 to which the assembly can be coupled with a suction source (not shown).

The pipe 57 for each take-up unit 33 is controlled by a valve 58 operated by a cam 59 carried by the plate 54.

The transfer device 32 cooperates not only with the presentation device 28 but also with a take-off device 60 which, as shown diagrammatically in dashed outline in FIG. 1, is operative at the offloading station 15 and is of similar construction to the presentation device 28, being rotatable stepwise about a vertical axis A3 parallel to the vertical axis A1 of the latter.

Stepwise control of the presentation device 28, the transfer device 32 and the take-off device 60 is achieved by means of indexing units (not shown), for example, in synchronism with control of the table 12 of the printing machine 10.

These provisions are familiar to the person skilled in the art and as they are not directly relevant to the present invention they will not be described here.

In accordance with the invention the loader 26 further includes, at the loading station 14, a retaining clamp 62 which has two branches 63 mobile relative to each other and in directions transverse to the path of movement of the lifting device 30, and therefore transverse to the column 21 of the stack support 18 present at the loading station 14, between an away position shown in FIGS. 3, 9A and 9B in which they do not impede passage of the stack 16 of objects 11 carried by the lifting device 30 and a close position shown in FIGS. 9B and 9C in which they support from beneath a particular number of objects 11.

The branches 63 of the retaining clamp 62 are carried by a module 64 which controls them in a manner which is known in itself and therefore not described here. The module 64 is carried by a column 61 projecting from a fixed support 65.

The annular plate constituting the presentation device 28 rotates about the fixed support 65.

It follows from what has been explained above that the module 64 of the retaining clamp 62 is fixed; only the branches 63 are mobile.

The branches 63 are both articulated to the module 64 about axes parallel to the vertical axis A1 of the presentation device 28.

The two branches 63 of the retaining clamp 62 have a circular inside contour covering at least approximately a quarter-circle.

Each has projecting towards the other at least one wedge 66 through which they make contact with an object 11.

In the embodiment shown each branch 63 of the retaining clamp 62 has two wedges 66 at the same level.

The upper facet 67 of the wedges 66 is preferably at an angle A to the horizontal between 25° and 35°, ideally close to 30°.

At least one branch 63 of the retaining clamp 62 is equipped with at least one blower nozzle 68.

In the embodiment shown only one branch 63 is equipped with a blower nozzle 68 while the other is equipped with a level sensing cell 69 controlling the module 64.

In addition to the retaining clamp 62 the fixed support 65 carries, on a column 70 parallel to the column 61, a sensor 71 responsive to the thickness of the objects 11 and controlling the stepper motor 40.

In conjunction with the use of a retaining clamp 62 each of the take-up units 33 with which the transfer device 32 is equipped is mobile vertically on the transfer device 32 against spring means 73 which urge it downwards at all times.

To this end, and as shown in FIG. 7, the head 55 of a take-up unit 33 is carried by a rod 74 sliding in a bush 75 carried by the transfer device 32 and the spring means 73 are simple coil springs operating in compression between the head 55 and the bush 75.

The rod 74 has a shoulder and is clamped to the transfer device 32 by a nut 76.

The rod is hollow to provide communication between the suction nozzles 56 and the associated pipe 57.

Finally, the loader 26 includes at the loading station 14 an auxiliary lifting device 77 operating from below and adapted to lift the stack support 18 present at the loading station 14 above the presentation device 28 and then to put it down on the latter.

The auxiliary lifting device 77 is a jack disposed under the presentation device 28 and whose piston rod 78 passes through an opening in the presentation device 28 which forms an object station 34, as previously described.

The jack constituting the auxiliary lifting device 77 is suspended from the fixed table 37 of the frame 36 and the piston rod 78, which passes through a bore 79 in the fixed table 37, carries at its end a plate 80 through which it comes into contact from beneath with the base 19 of a stack support 18.

The plate 80 has a projecting rim 81 for centering the stack support 18.

The auxiliary lifting device 77 moves the stack support 18 present at the loading station 14 from a low position (9B and 9C) in which it rests on the presentation device 28 to a high position (FIGS. 8, 9A and 9B) at a height H above the presentation device 28.

Referring to FIG. 9A, assume first that objects 11 are currently being removed from a stack 16 at the loading station 14.

The stack 16 is therefore carried by the arm 50 of the lifting device 30 through the intermediary of the ring 22 of the respective stack support 18, this arm 50 being in the deployed position and the base 19 of the stack support 18 being held in the raised position by the auxiliary lifting device 77.

The retaining clamp 62 is open to provide free passage for the stack 16.

On each take-up cycle the vertical reciprocation of the transfer device 32, shown diagrammatically by a double-headed arrow F1 in FIGS. 9A, 9B, 9C and 9D, causes the transfer device 32 to apply a take-up unit 33 to the object 11 at the top of the stack 16.

The take-up unit 33 being then coupled to the associated suction source under the control of the valve 58, the object 11 concerned is taken up by the take-up unit 33 and therefore by the transfer device 32 which, after rotating one step as shown by the arrow F2 in FIG. 1 and interruption of the communication between the take-up unit 33 and the suction source, then puts it down on the table 12 of the printing machine 10.

Given the stepwise upward movement of the lifting device 30, the level at which the objects 11 are taken up remains constant.

As each object is taken up the spring means 73 of the take-up unit 33 in service advantageously damp entry into contact with the object 11 to be taken up and the blower nozzle 68 carried by one of the branches 63 of the retaining clamp 62 advantageously facilitates release of the latter.

When the cell 69 carried by the other branch 63 of the retaining clamp 62 senses that there remains only a predetermined number of objects 11 in the stack 16, for example around four or five objects, the retaining clamp 62 is closed (FIG. 9B) so that it is inserted under the objects 11, coming into contact with the last of them.

The auxiliary lifting device 77 then lowers the stack support 18 so that the column 21 of the latter is retracted from the objects 11 retained by the retaining clamp 62 (FIG. 9B), the height H being determined accordingly; at the same time, the arm 50 of the lifting device 30 moves to its retracted position and, under the control of the stepper motor 40, the lifting device 30 starts to move down to bring the arm 50 level with the presentation device 28.

The presentation device 28 then rotates one step, in the direction of the arrow F3 in FIG. 1, which removes the empty stack support 18 from the loading station 14 and moves a stack support 18 carrying a new stack 16 of objects 11 into the loading station 14 (FIG. 9C).

In the meantime, however, the objects 11 retained by the retaining clamp 62 advantageously continue to be taken therefrom.

This has the advantage that the feeding of objects 11 to the printing machine 10 is not interrupted.

As each object is taken up the spring means 73 of the take-up units 33 enable them to adapt systematically to the instantaneous take-up height, which reduces progressively as each object is taken up since the retaining clamp 62 operates at a specific fixed level.

From this point of view the spring means 73 constitute level compensating means operative between the retaining clamp 62 and the take-up unit 33 in service at the time in question.

Alternatively, to constitute level compensating means of this kind the retaining clamp 62 could itself be mobile vertically, and for example stepwise, like the lifting device 30.

Immediately a new stack support 18 carrying a new stack 16 of objects 11 to be printed is present at the loading station 14 the retaining clamp 62 is opened (FIG. 9D), the auxiliary lifting device 77 raises the new stack support 18 and, its arm 50 being again in the deployed position, the lifting device 30 takes control of the new stack 16 of objects 11, by the process already described, so that the objects 11 are taken off with no discontinuity.

Under the control of the level sensing cells 46, the lifting device 30 is adapted initially to raise the stack 16 at a high speed and thereafter at a low speed corresponding to the taking up of the objects 11, to cater for the greater or lesser number of objects 11 in it.

Of course, the present invention is not limited to the embodiment described and shown, but encompasses all variant executions thereof.

There is claimed:

1. Loader for a machine for printing objects in a stack including a presentation device adapted to convey to a loading station at least one stack support for carrying a stack of objects to be printed, a lifting device operative at said loading station for engaging a stack of objects from below and for raising the stack of objects stepwise as objects are removed therefrom, a transfer device operative between said loading station and said printing machine for removing an object from the stack located at said loading station and then conveying the object to said printing machine, said transfer device being equipped with at least one take-up unit and being arranged for vertical reciprocating movement during a take-up cycle, a retaining clamp at said loading station having two branches mobile relative to each other, both of the branches being mobile transversely to a path of movement defined by said lifting device between a remote position in which displacement of said stack of objects carried by the lifting device is unimpeded and an operative position in which the branches are adapted to retain from below a selected number of objects in reserve for feeding to the printing machine while the stack support is being changed, the reserve of objects defining a take-up height, and level compensating means being operatively disposed between said retaining clamp and said take-up unit to compensate for variations in the take-up height as the reserve of objects retained by said retaining clamp diminishes.

2. Loader according to claim 1 wherein each of said two branches of said retaining clamp has at least one wedge projecting towards the other branch, said wedges being adapted to come into contact with an object.

3. Loader according to claim 2 wherein an upper facet of each said wedge is at an angle to the horizontal between 25° and 35°.

4. Loader according to claim 3 wherein each of said two branches of said retaining clamp has two said wedges.

5. Loader according to claim 1 wherein at least one branch of said retaining clamp is equipped with at least one blower nozzle.

6. Loader according to claim 1 wherein said retaining clamp is under the control of a level sensing cell.

7. Loader according to claim 6 wherein said level sensing cell is carried by one branch of said retaining clamp.

8. Loader according to claim 1 wherein said presentation device comprises an annular plate rotatable stepwise about a fixed support carrying said retaining clamp, said presentation device having a circumferentially distributed plurality of object stations each adapted to receive said stack support.

9. Loader according to claim 1 wherein said lifting device includes a nut assembly meshing with a lead screw operated by a stepper motor and is slidably engaged with two guides parallel to said screw and carrying a rod parallel to said screw, said rod carrying a transverse arm and pivoting to and fro between a deployed position in which said arm is in operative relation with respect to said loading station and a retracted position in which said arm is spaced from said loading station.

10. Loader according to claim 1 wherein said transfer device comprises a plate rotatable stepwise and carrying a plurality of said take-up units circumferentially spaced from one another.

11. Loader according to claim 1 wherein said level compensating means comprising resilient means urging said take-up unit against reciprocating movement of said transfer device.

12. Loader according to claim 1 wherein said retaining clamp is mounted for vertical movement to define said compensating means.

13. Loader for a machine for printing objects in a stack including a presentation device adapted to convey to a loading station at least one stack support for carrying a stack of objects to be printed, a lifting device operative at said loading station for engaging a stack of objects from below and for raising the stack of objects stepwise as objects are removed therefrom, a transfer device operative between said loading station and said printing machine for removing an object from the stack located at said loading station and then conveying the object to said printing machine, said transfer device being equipped with at least one take-up unit and being arranged for vertical reciprocating movement during a take-up cycle, a retaining clamp at said loading station having two branches mobile relative to each other, both of the branches being mobile transversely to a path of movement defined by said lifting device between a remote position in which displacement of said stack of objects carried by the lifting device is unimpeded and an operative position in which the branches are adapted to retain from below a selected number of objects, and level compensating means being operatively disposed between said retaining clamp and said take-up unit, said level compensating means urging said take-up unit downwards at all times against reciprocating movement of said transfer device.

14. Loader according to claim 13 wherein said level compensating means comprises resilient means.

15. Loader for a machine for printing objects in a stack including a presentation device adapted to convey to a loading station at least one stack support for carrying a stack of objects to be printed, a lifting device operative at said loading station for engaging a stack of objects from below and for raising the stack of objects stepwise as objects are removed therefrom, a transfer device operative between said loading station and said printing machine for removing an object from the stack located at said loading station and then conveying the object to said printing machine, said transfer device being equipped with at least one take-up unit and being arranged for vertical reciprocating movement during a take-up cycle, a retaining clamp at said loading station having two branches mobile relative to each other, both of the branches being mobile transversely to a path of movement defined by said lifting device between a remote position in which displacement of said stack of objects carried by the lifting device is unimpeded and an operative position in which the branches are adapted to retain from below a selected number of objects, and level compensating means being operatively disposed between said retaining clamp and said take-up unit, further comprising an auxiliary lifting device disposed at said loading station, operating from below and adapted selectively to raise said stack support relative to said presentation device and to lower said stack support relative to said presentation device.

16. Loader according to claim 15 wherein said auxiliary lifting device comprises a jack disposed under said presentation device, said jack having a piston rod passing through an opening in said presentation device.

17. Loader for a machine for printing objects in a stack including a presentation device adapted to convey to a loading station at least one stack support for carrying a stack of objects to be printed, a lifting device operative at said loading station for engaging a stack of objects from below and for raising the stack of objects stepwise as objects are removed therefrom, a transfer device operative between said loading station and said printing machine for removing an object from the stack located at said loading station and then conveying the object to said printing machine, said transfer device being equipped with at least one take-up unit and being arranged for vertical reciprocating movement during a take-up cycle, a retaining clamp at said loading station having two branches mobile relative to each other, both of the branches being mobile transversely to a path of movement defined by said lifting device between a remote position in which displacement of said stack of objects carried by the lifting devices is unimpeded and an operative position in which the branches are adapted to retain from below a selected number of objects for take-up by said take-up unit, said stack support and said retaining clamp being mounted for relative vertical movement to enable replacement of said stack support while the retaining clamp is in operative position for take-up of the selected number of objects.

* * * * *